(12) United States Patent
Tenca et al.

(10) Patent No.: US 10,137,788 B2
(45) Date of Patent: Nov. 27, 2018

(54) POWER ELECTRONIC DEVICE AND METHOD

(71) Applicant: GENERAL ELECTRIC COMPANY, Schenectady, NY (US)

(72) Inventors: Pierluigi Tenca, Munich (DE); Paolo Soldi, Munich (DE); Fabio Carastro, Munich (DE)

(73) Assignee: General Electric Company, Schenectady, NY (US)

( * ) Notice: Subject to any disclaimer, the term of this patent is extended or adjusted under 35 U.S.C. 154(b) by 82 days.

(21) Appl. No.: 14/856,286

(22) Filed: Sep. 16, 2015

(65) Prior Publication Data

US 2017/0072806 A1    Mar. 16, 2017

(51) Int. Cl.
| | | |
|---|---|---|
| B60L 1/00 | (2006.01) |
| B60L 3/00 | (2006.01) |
| H02G 3/00 | (2006.01) |
| B60L 11/18 | (2006.01) |
| H02M 3/158 | (2006.01) |
| H02M 1/00 | (2006.01) |

(52) U.S. Cl.
CPC ............ *B60L 11/18* (2013.01); *H02M 3/158* (2013.01); *H02M 2001/009* (2013.01)

(58) Field of Classification Search
CPC .. H02M 3/158; H02M 3/335; H02M 3/33507; H02M 3/156; H02M 1/36; H02M 1/4216; H02M 1/42; H02M 7/06; H02M 7/217; H02M 7/5387; G05F 1/40; G05F 1/56; B60L 11/18; H04B 5/00; H03K 7/08
USPC ........ 307/31, 10.1, 9.1, 66, 64, 80; 363/124, 363/126, 16; 323/282, 283, 284, 271, 323/273, 222; 332/109, 107
See application file for complete search history.

(56) References Cited

U.S. PATENT DOCUMENTS 5,932,995 A   8/1999  Wagoner
6,222,352 B1  4/2001  Lenk
(Continued)

FOREIGN PATENT DOCUMENTS

CN        1149812 A   5/1997
CN      101401287 A   4/2009
(Continued)

OTHER PUBLICATIONS

Ma, Dongsheng, et al.; "Single-inductor multiple-output switching converters with bipolar outputs," The 2001 IEEE International Symposium on Circuits and Systems; vol. 3, Syndey, NSW, May 2001, pp. 301-304.

(Continued)

*Primary Examiner* — Rexford Barnie
*Assistant Examiner* — Jagdeep Dhillon
(74) *Attorney, Agent, or Firm* — GE Global Patent Operation; Pabitra Chakrabarti

(57) ABSTRACT

A power electronic device includes at least one inductor configured to couple to a first capacitor and a second capacitor. The power electronic device includes a controller configured to control a first current conducting through the inductor and a second current conducting through the inductor. The first and second currents conduct in opposite directions with respect to each other, and the first and second currents interact with each other through the inductor such that a net direct current (DC) component through the inductor is approximately zero.

14 Claims, 4 Drawing Sheets

(56) References Cited

U.S. PATENT DOCUMENTS

| | | | |
|---|---|---|---|
| 7,548,046 B1* | 6/2009 | Stratakos | H02M 3/157 |
| | | | 323/282 |
| 7,683,590 B2 | 3/2010 | Yoshida | |
| 7,709,976 B2 | 5/2010 | Bazinet | |
| 7,741,914 B1 | 6/2010 | Nabicht | |
| 8,513,928 B2 | 8/2013 | Totterman et al. | |
| 8,659,272 B2 | 2/2014 | Watanabe et al. | |
| 8,917,075 B2 | 12/2014 | Leipold et al. | |
| 8,922,187 B2 | 12/2014 | Swanson | |
| 8,928,248 B2 | 1/2015 | Ishii et al. | |
| 8,937,472 B2 | 1/2015 | Heo et al. | |
| 2008/0136374 A1* | 6/2008 | Nelson | B60L 11/1887 |
| | | | 320/128 |
| 2009/0072875 A1 | 3/2009 | Tarng et al. | |
| 2011/0187189 A1 | 8/2011 | Moussaoui et al. | |
| 2011/0210707 A1* | 9/2011 | Marsili | H02M 3/158 |
| | | | 323/271 |
| 2012/0170322 A1* | 7/2012 | Thomas | H02M 3/33569 |
| | | | 363/16 |
| 2013/0107596 A1* | 5/2013 | Mabuchi | H02M 7/48 |
| | | | 363/124 |
| 2013/0163292 A1 | 6/2013 | Basic et al. | |
| 2013/0258728 A1 | 10/2013 | Takizawa | |
| 2014/0092659 A1* | 4/2014 | Lin | H02M 7/06 |
| | | | 363/126 |
| 2014/0191745 A1 | 7/2014 | Mari Curbelo et al. | |
| 2014/0285014 A1* | 9/2014 | Calhoun | H02M 3/158 |
| | | | 307/31 |
| 2014/0327420 A1* | 11/2014 | Lee | H02M 3/07 |
| | | | 323/282 |
| 2015/0061382 A1* | 3/2015 | Roessler | B60L 11/1803 |
| | | | 307/10.1 |
| 2015/0109826 A1* | 4/2015 | Driessen | G01R 33/3852 |
| | | | 363/17 |
| 2015/0381032 A1* | 12/2015 | Li | H02M 1/36 |
| | | | 323/271 |
| 2016/0043633 A1* | 2/2016 | Phadke | H02M 1/4216 |
| | | | 363/21.08 |
| 2016/0144810 A1* | 5/2016 | Rodel | B60R 16/03 |
| | | | 307/10.1 |
| 2016/0359427 A1* | 12/2016 | Ghosh | H02M 7/217 |
| 2016/0369734 A1* | 12/2016 | Ferguson | H02M 3/156 |

FOREIGN PATENT DOCUMENTS

| | | |
|---|---|---|
| CN | 102790532 A | 11/2012 |
| CN | 103746557 A | 4/2014 |
| CN | 104716825 A | 6/2015 |
| JP | 2001-086750 A | 3/2001 |
| WO | 2012-144249 A1 | 10/2012 |
| WO | 2015004120 A2 | 1/2015 |
| WO | 20151004121 A1 | 1/2015 |

OTHER PUBLICATIONS

Himmelstos, Felix, A., et al.; "Analysis of a device for converting a unipolar input voltage into two symmetric bidirectional output voltages with a magnetically coupled coil;" Power Electronics and Motion Control Conference; Sep. 2008, pp. 331-336.

Filsoof, Kia, et al.; "A transformerless modular step-up dc-dc converter for high power applications." IET Power Electronics, vol. 7, Issue 8; Aug. 2014, pp. 2190-2199.

Ahn, Y., et al., "A Multiphase Buck Converter With a Rotating Phase-Shedding Scheme For Efficient Light-Load Control," IEEE Journal of Solid-State Circuits, vol. 49, No. 11, pp. 2673-2683 (Nov. 2014).

Notification of Reasons for Refusal issued in connection with corresponding JP Application No. 2016-175112 dated Jan. 30, 2018.

Machine translation and First Office Action and Search issued in connection with corresponding CN Application No. 201610822631.0 dated Jun. 27, 2018.

* cited by examiner

POWER ELECTRONIC DEVICE AND METHOD

TECHNICAL FIELD

The subject matter disclosed herein relates to power conversion, and, more particularly, to a power electronic device and method for converting energy between two or more direct current (DC) voltages.

BACKGROUND

Some circuits may be designed to withstand various operating characteristics. Power conversion plays a role in various industries, including the transportation industry. One way to convert power is with a DC-DC converter. However, the DC-DC converter may include multiple inductors, which may result in a certain amount of DC current that persists in the DC-DC converter. Such a configuration is inefficient and causes overheating in switches of the DC-DC converter.

In view of the foregoing, it may be understood that there may be significant problems and shortcomings associated with current solutions and technologies for power conversion.

SUMMARY

In a first embodiment, a power electronic device includes at least one inductor configured to couple to a first capacitor and a second capacitor, and a controller configured to control a first current conducting through the inductor and a second current conducting through the inductor, wherein the first and second currents conduct in opposite directions with respect to each other, and the first and second currents interact with each other through the inductor such that a net direct current (DC) component through the inductor is approximately zero.

In a second embodiment, a method includes controlling a first flow of a first current and a second flow of a second current conducting in opposite directions through an inductor so that a net current through the inductor comprises primarily odd harmonics.

In a third embodiment, a vehicle includes an electric propulsion system having an energy source coupled to a direct current (DC) bus, and a power electronic device coupled to the DC bus, wherein the power electronic device comprises at least one inductor coupled to a first capacitor and a second capacitor, and a controller operable to cause a first current conducting through the at least one inductor, and a second current conducting through the at least one inductor, wherein the first and second currents conduct in opposite directions with respect to each other, and the first and second currents interact with each other through the at least one inductor such that a net DC component through the at least one inductor is approximately zero.

BRIEF DESCRIPTION OF THE DRAWINGS

These and other features and aspects of the disclosure are provided with reference to the accompanying drawings in which like characters represent like parts throughout the drawings, wherein.

DETAILED DESCRIPTION

The subject matter disclosed herein relates to power conversion, and, more particularly, to a power electronic device and method for converting energy between two or more direct current (DC) voltages.

The systems and methods described herein are directed to a power converter that provides a more compact, reliable, and/or affordable DC-DC power converter. Embodiments of the present disclosure are directed to a middle-point single-output converter. In one embodiment, a single inductor of the middle-point converter operates with a DC component of current at or near approximately zero by having symmetrical switching modes of operation, thereby allowing the use of a single inductor, which occupies less space as compared to the inductors of other converters. Additionally, some embodiments of the present disclosure may provide improved protection by using the single AC inductor. Further, the converter may utilize fewer switch pairs and be better suited for silicon carbide (SiC) technology than other converters.

Figure 1:
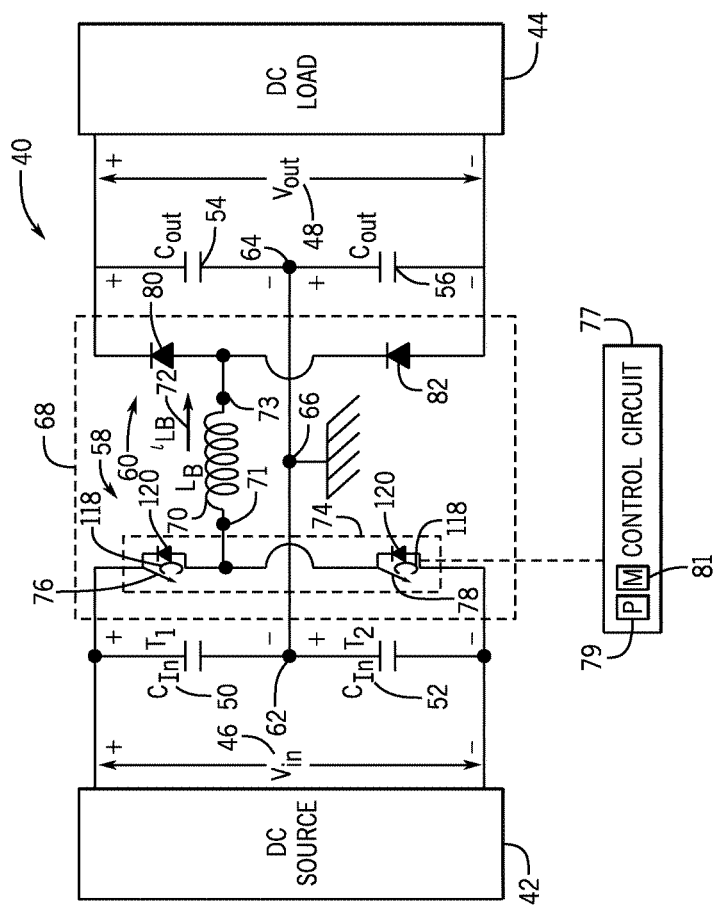
FIG. 1 is a schematic diagram of an embodiment of a middle-point converter that converts DC power from one voltage to another.

With the foregoing in mind, in one embodiment, a power electronic device may include a middle-point single-output converter. This may save space, weight, electrical losses, and component count as compared to other types of converters. This embodiment may be useful in low and medium voltage settings, where fewer components may be used, such as a no chain-link converter. As used herein, low voltage may be, e.g., from about 10V to about 2,000V and medium voltage may be, e.g., from about 2,000V to about 10,000V. With reference to FIG. 1, a schematic diagram of an embodiment is shown of a middle-point converter 40 that converts power from a DC source 42 at one voltage to a DC load 44 at another voltage. That is, $V_{in}$ 46 may be increased or decreased to $V_{out}$ 48.

As shown in FIG. 1, the converter 40 may be a buck converter that converts the input voltage $V_{in}$ 46 to an output voltage $V_{out}$ 48. The converter 40 may be coupled to the DC source 42 to the DC load 44 with one or more capacitors (e.g., $C_{IN}$ 50, 52, $C_{OUT}$ 54, 56). On an input side 58, a first DC voltage (e.g., voltage across $C_{IN}$ 50) and a second DC voltage (e.g., voltage across $C_{IN}$ 52) may have opposite polarities with respect to a first common reference point 62. That is, the middle-point converter 40 may have positive (e.g., across $C_{IN}$ 50) and negative voltages (e.g., across $C_{IN}$ 52) with respect to a central point (e.g., common reference point 62). Similarly, on an output side 60, a third DC voltage (e.g., voltage across $C_{OUT}$ 54) and a fourth DC voltage (e.g., voltage across $C_{OUT}$ 56) may have opposite polarities with respect to a second common reference point 64. Like the input side 58, the output side 60 of the middle-point converter 40 may also have positive (e.g., across $C_{OUT}$ 54) and negative (e.g., across $C_{OUT}$ 56) voltages with respect to a central point (e.g., common reference point 62). Further, the first and second common reference points 62, 64 may be coupled with respect to ground 66. In some cases, the positive and negative voltages may be different from one another on a side, or the voltages may be approximately equal to one another. The middle-point converter 40 may include one or more phase modules 68 to convert the input voltage level $V_{in}$ 46 to the output voltage level $V_{out}$ 48.

The phase module 68 may include a single inductor 70 between the input side 58 and the output side 60. Further, the phase module 68 may include one or more switches on the input side 58. For example, the phase module 68 may include a first switch 76 on the positive side and a second switch 78 on the negative side. Current $I_{LB}$ 72 through the single inductor 70 varies depending on whether the switches 76 or 78 are open or closed. As shown in FIG. 1, the phase module 68 may include a two-level module 74 having switches 76, 78 on the input side 58. In some cases, modules having the switches 76, 78 may be rated for a differential voltage. Other suitable voltages and applications may include voltage characteristics for silicon carbide (SiC) devices having voltage capabilities that differ from silicon devices.

The phase module 68 may include at least two switches and/or diodes on the output side 60. For example, the output side 60 may include a first diode 80 on the positive side and a second diode 82 on the negative side. Suitable switches may include and refer to mechanical switches, electronic switches, insulated-gate bipolar transistors (IGBTs), field effect transistors (FETs), and the like. As used herein, diodes may be referred to interchangeably as switches. That is, the term switch as used herein may refer to a diode or other like component, because diodes may operate by opening and closing based on the flow of current (e.g., reverse bias or forward bias) and switches may open and close. In the case of a short circuit on the input side 58, the presence of diodes and/or switches on the output side 60 may protect the input side 58 from receiving energy stored in one or more of the output capacitors $C_{OUT}$ 54, 56. That is, the input side 58 may be protected via commutation (e.g., diodes are reversed biased and act as an open circuit) of the switches and/or diodes on the output side 60 when a fault occurs.

The inductor 70 of the phase module 68 may include one or more terminals. In the illustrated embodiment two terminals 71, 73 are shown. The first terminal 71 may be coupled to switches on the input side 58. The first terminal 71 may be coupled between the first switch 76 and the second switch 78. Similarly, the second terminal 73 may be coupled to switches and/or diodes (e.g., diodes 80, 82) on the output side 78. In particular, the second terminal 73 may be coupled between the first diode 80 and the second diode 82. The first terminal 71 and the second terminal 73 may be coupled to the capacitors $C_{IN}$ 50, 52 and/or $C_{OUT}$ 54, 56 through the switches 76, 78 and/or diodes 80, 82 (e.g., indirectly coupled to the capacitors via the switches and/or diodes).

The switches 76, 78 may open and close. Such operation may be based on a duty cycle controlled by a controller or control circuit 77. The control circuit 77 may include a processor 79 or multiple processors and memory 81. The processor 79 may be operatively coupled to the memory 81 to execute instructions for carrying out the techniques described herein. These instructions may be encoded in programs or code stored in a tangible non-transitory computer-readable medium, such as the memory 81 and/or other storage. The processor 79 may be a general purpose processor, system-on-chip (SoC) device, or application-specific integrated circuit, or some other processor configuration.

It should be appreciated that these various computing elements, computers, and/or components may include one or more modules or additional components. As used herein, the term "module" may be understood to refer to computing software, firmware, hardware, cloud-based processing systems, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

Memory 81, in the embodiment, includes a computer readable medium, such as, without limitation, a hard disk drive, a solid state drive, a diskette, a flash drive, a compact disc, a digital video disc, random access memory (RAM), and/or any suitable storage device that enables processor 79 to store, retrieve, and/or execute instructions and/or data. Memory 81 may include one or more local and/or remote storage devices. The control circuit 77 may control the duty cycle by sending signals to gates to open or close the switches 76, 78. The duty cycle may be a ratio between the ON interval of a switch and a triangular carrier fundamental period (1/frequency), which can range from 0 to 1. The duty cycle may be varied based on inputs to the control circuit 77 or from data stored in the memory 81.

Figure 2:
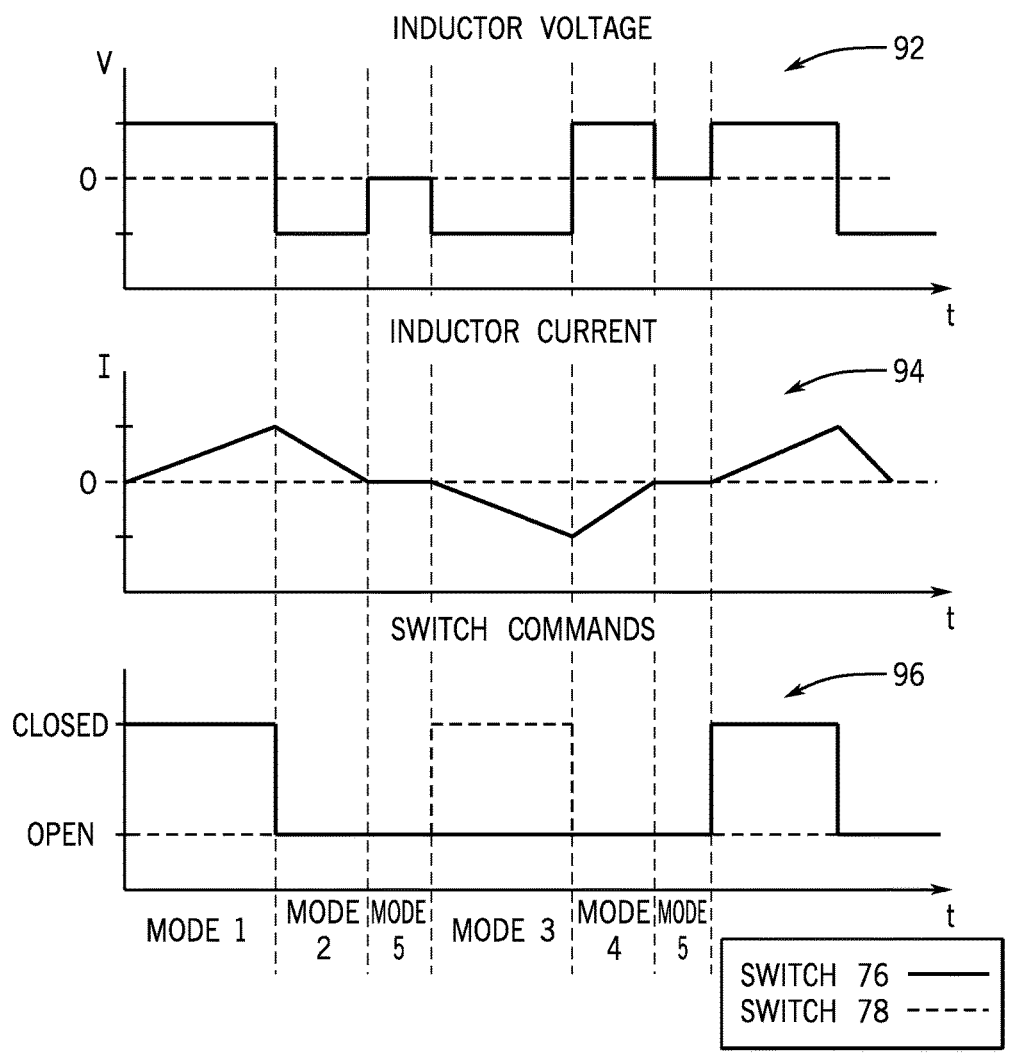
FIG. 2 is a set of graphs illustrating power characteristics of an inductor in an embodiment of the middlepoint converter of FIG. 1.

The control circuit 77 of the converter 40 may cycle among several different switching modes. FIG. 2 is a set of graphs showing the voltage across the inductor (graph 92), current through the inductor (graph 94), and switching commands (graph 96) for switching open and closed the switches 76, 78 of an embodiment of the inductor 12 of the middle point converter 40. For example, a first mode may involve keeping switch 76 closed, switch 78 open, and diode 82 in reverse bias. As shown in graph 94, the positive current (i.e., $I_{LB}$ 72>0) through the inductor 70 increases during a first mode. A second mode may involve keeping the switches 76, 78 open and the diode 82 in reverse bias with the inductor 70 discharging in the negative direction. As shown in graph 94, the current $I_{LB}$ 72 through the inductor 70 decreases as the capacitors 50, 52 are not connected to charge the inductor 70. In the second mode, there is positive current through the inductor 70, and the inductor 70 is discharging the current $I_{LB}$ 72. A third mode may involve the switch 76 open, switch 78 closed, and diode 80 in reverse bias. As shown in graph 94, during mode 3, the current $I_{LB}$ 72 through the inductor 70 increases in the reverse direction. That is, the inductor 70 is charging and there is a negative current (i.e., $i_{LB}$ 72<0) through the inductor 70. A fourth mode may involve switches 76, 78 open and diode 80 in reverse bias. As shown in graph 94, the inductor 70 is discharging the current $I_{LB}$ 72 in the reverse direction. A fifth mode may involve both switches 76, 78 open. During mode one and two, diode 82 may be in reverse bias. During mode three and four, diode 80 may be in reverse bias. As shown in FIG. 2, the modes with non-zero inductor current are two-by-two symmetrical with respect to ground 51. That is, the first mode and the second mode are symmetrical to the third mode and the fourth mode. For example, the first mode is symmetrical to the third mode as the inductor 70 charges with current $I_{LB}$ 72 in opposite directions during a similar time period and/or magnitude. Similarly, the second mode is symmetrical to the fourth mode as the inductor 70 discharges with current $I_{LB}$ 72 in opposite directions during a similar time period and/or magnitude. As such, the first, second, third, and fourth modes operate symmetrically in forward and reverse directions. This creates a symmetrical behavior of the capacitive and inductive couplings with respect to ground 51.

The average value of current in the inductor may be zero, or approximately zero. This may be due to the symmetry of the switching modes during operation that result in symmetrical inductor currents 72. Further, as the current $I_{LB}$ 72 through the inductor 70 shown in graph 94 possesses half-wave symmetry, the current 72 may include primarily odd harmonics, as opposed to both even and odd harmonics. As such, the average value of current in the inductor 70 caused by the current from the input side 58 and the output side 60 may control a level of constructive harmonics within the inductor 70. As such, the inductor 70 may include reduced harmonics and the half-wave symmetry of the middle-point converter 40 may result in better power quality, a smaller and/or more affordable inductor that may be used to provide the same power as those with multiple inductors. As such, the converter 40 that utilizes the phase module 68 with the single inductor 70 may allow for a different inductor than might otherwise be useful due, at least in part, to the half-wave symmetry and resulting relatively reduced harmonics. Further, symmetrical behavior of the inductor current may reduce electromagnetic interference (EMI). Symmetrical use of the input side switches 76, 78 may allow the thermal stresses of the phase module 68 to be distributed more evenly between the switches 76, 78 of the positive and negative sides, thereby reducing thermo-mechanical strains inside the phase module 68. The symmetry of the converter 40 may allow for fewer switch pairs, diodes, or other components due to standard packages that can include the pair of controllable switches 76,78 and anti-parallel diodes 116 as compared to other types of converters.

Figure 3:
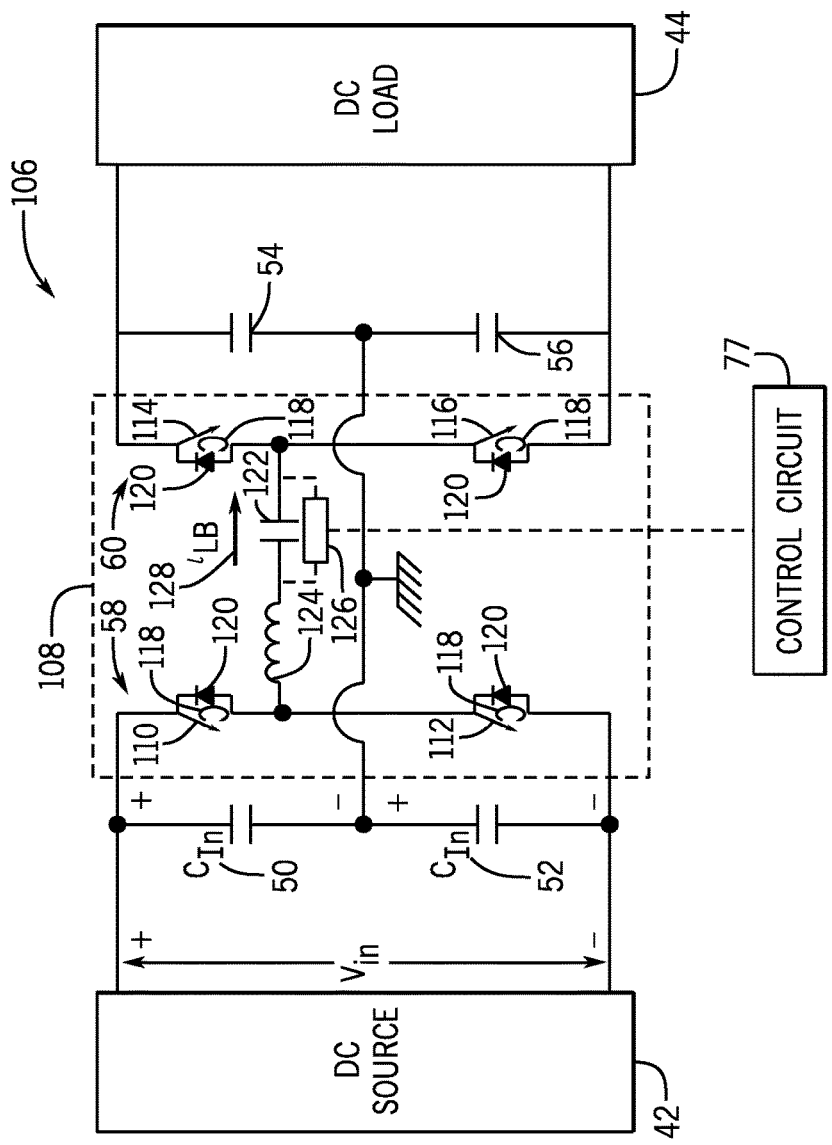
FIG. 3 is a schematic diagram of another embodiment of a middle-point converter.

FIG. 3 is a schematic diagram of a buck-boost middle point converter 106 having a phase module 108 that can be used either to increase or decrease the voltage. The buck-boost middle-point converter 106 may include switches 110, 112 on the input side 58 and switches 114, 116 on the output side 60. When the system is in buck mode (i.e., decreasing voltages from the input side 58 to the output side 60), the input side 58 switches 110, 112 may be utilized, and when the system is in boost mode (i.e., increasing voltages from the input side 58 to the output side 60), the output side 60 switches 114, 116 may be utilized. In some embodiments, either the input side switches are used or the output side switches are used.

In certain embodiments, the phase module 108 may include one or more closed paths 118. Suitable closed paths may include circuit loops. For example, in FIG. 3, there are four closed paths 118, and each closed path 118 includes one switch 110, 112, 114, or 116 and one diode 120 (e.g., freewheeling diode). Similarly, there are two closed paths in FIG. 1, such that each closed path includes one switch and one diode.

Referring back to FIG. 3, the phase module 108 may include a current conditioning capacitor 122 (e.g., high capacitance and low voltage capacitor, or a super capacitor) in series with an inductor 124. Further, varistors and/or tranzorbs 126 can be connected in parallel to the capacitor to limit the capacitor voltage and temporarily divert the current into the varistor and/or tranzorb 126 when an over-voltage condition occurs due to transients and/or failures. The current conditioning capacitor 122 may ensure current $I_{LB}$ 128 through the inductor 124 has an average of approximately zero when used in conjunction with the control circuit 77. For example, the voltage across the capacitor 122 may be monitored over a time period by the control circuit 77 and compared to thresholds corresponding to properties of the inductor 124 (e.g., inductor design) and/or desired operation of the inductor 124. When the monitored voltage exceeds these thresholds, adjustments (e.g., changes in duty cycle of the switches 110, 112, 114, and/or 116) may be adopted by the control circuit 77 to counterbalance the resulting average inductor current $I_{LB}$ 128. Further, the current conditioning capacitor 122 may enable the phase module 108 to operate in a resonant mode where the current $I_{LB}$ 128 through the inductor 124 is conditioned (e.g., smoothed) to allow the control circuit 77 to identify whether the counterbalances should be adopted.

In some embodiments, either switches connected to the input side 58 or switches connected to the output side 60 may be commutated over a time interval composed of two switching periods. That is, power is transferred in either direction and switches on the receiving side are left open. For example, switches 110 and 112 may be open over a time interval of at least two periods (e.g., when transferring power from source to load) while the switches 114, 116 open and/or close according to the modes of operation described above. Alternatively, switches 114 and 116 may be open over a time interval of at least two periods (e.g., when transferring power from load to source) while the switches 110 and 112 open and/or close according to the modes of operation described above. As such, the converter 106 may operate as either a buck converter or a boost converter.

The current $I_{LB}$ 128 through the inductor 124 may be in discontinuous conduction mode until the duration at non-zero inductor current values reaches 1/frequency. Based on the inductance, frequency, $V_{in}$, and $V_{out}$, the maximum transferred average power reaches a limit for such boundary conditions, because, in each half period, the current has no more time interval left to raise from zero and return to zero. That is, the converter may operate in a single, discontinuous mode until maximum power is reached and the converter can transfer power under the boundary conditions.

Figure 4:
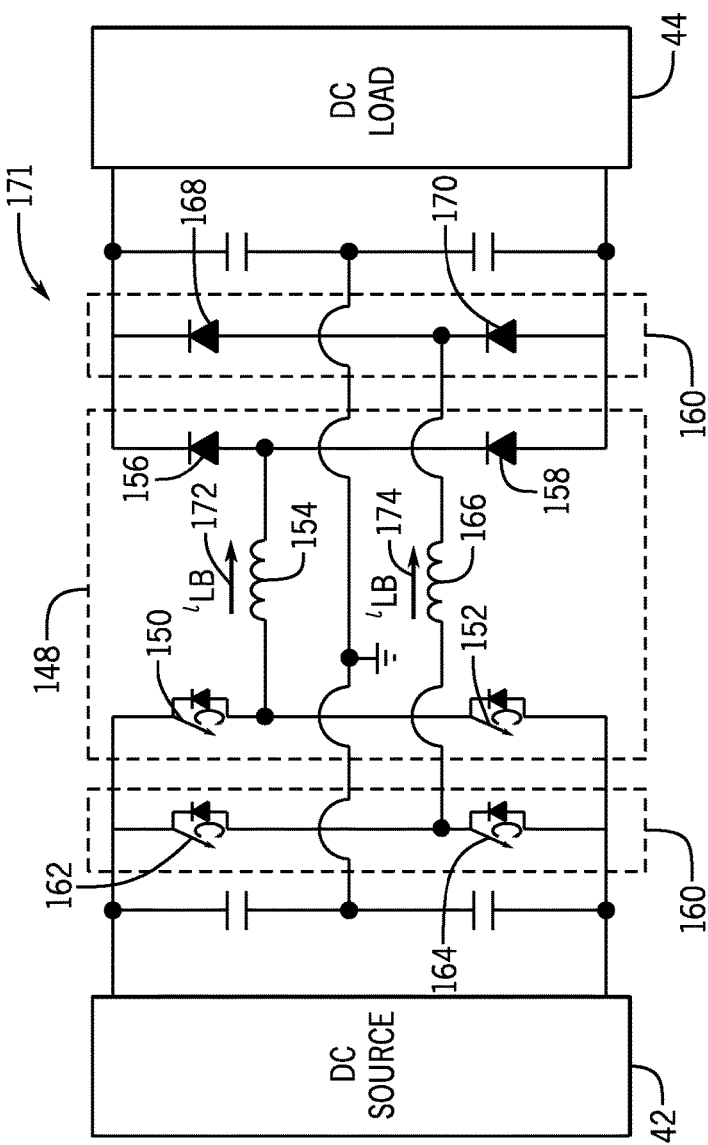
FIG. 4 is a schematic diagram of an embodiment of a middle-point converter with multiple phase modules.

In certain embodiments, two or more phase modules may be coupled in parallel. As shown in FIG. 4, a first phase module 148 may include similar components (e.g., switches 150, 152, inductor 154, and diodes 156, 158) to the phase module 68 of FIG. 1 or the phase module 108 of FIG. 3. The first phase module 148 may be coupled in parallel to a second phase module 160 having similar components (e.g., switches 162, 164, inductor 166, and diodes 168, 170) to the first phase module 148, which may be coupled to one or more other phase modules (e.g., in parallel). By using multiple phase modules 148, 160, the converter 171 may create a spectrum of the current in the capacitors 54, 56 by time interleaving to where there is a phase shift between the current $I_{LB}$ 172, 174 through the inductors 154, 166 of the phase modules 148, 160. For example, the effect of the third harmonic in the one or more inductors of a three phase module embodiment may be mitigated by phase shifting the three phases by $2\pi/9$ radians (40 degrees) with a period of 2/frequency.

In the preceding specification, various embodiments have been described with reference to the accompanying drawings. It will, however, be evident that various modifications and changes may be made thereto, and additional embodiments may be implemented, without departing from the broader scope of the disclosure as set forth in the claims that follow. The specification and drawings are accordingly to be regarded in an illustrative rather than restrictive sense.

At this point, it should be noted that the power generation device and methods described herein may be employed in stationary or in mobile applications. With regard to stationary applications, a suitable system may include power generation. Suitable power generation systems may include fuel-engine driven systems, wind power systems, solar systems, hydro-electric power systems, and the like. Suitable mobile applications may include vehicles and portable devices. Vehicles may include passenger vehicles, commercial vehicles, locomotives, off-highway and mining vehicles, agricultural vehicles, marine vessels, and aircraft. For example, a vehicle may include an electric propulsion system having an energy source coupled to a DC bus. The vehicle may further include a power electronic device, such as one or more of the power converters 40 and 106. The power electronic device may provide power to a motor of the electric propulsion system.

It should also be appreciated that the power generation device and methods described herein may involve the processing of input data and the generation of output data to some extent. This input data processing and output data generation may be implemented in hardware or software. For example, specific electronic components may be employed in similar or related circuitry associated with providing improved power generation as described above. If such is the case, it is within the scope of the present disclosure that such instructions may be stored on one or more processor readable storage media, or transmitted to one or more processors.

This written description uses examples to enable a person of ordinary skill in the art to practice the disclosure, including making and using any devices or systems and performing any methods. The patentable scope of the disclosure is defined by the claims, and may include other examples. Such other examples are within the scope of the claims if they have structural elements that do not differ from the literal language of the claims, or if they include equivalent structural elements with insubstantial differences from the literal languages of the claims.

The invention claimed is:

1. A power electronic device, comprising:
   at least one inductor configured to couple to a first capacitor and a second capacitor; and
   a controller configured to control a first current conducting through the inductor and a second current conducting through the inductor, wherein the first and second currents conduct in opposite directions with respect to each other, and the first and second currents interact with each other through the inductor such that a net direct current (DC) component through the inductor is approximately zero, wherein the controller is configured to cause a spectrum to be created in a fifth current associated with the second capacitor via time interleaving, such that the first current is phase shifted with respect to the third current.

2. The power electronic device of claim 1, wherein the at least one inductor is a single inductor.

3. The power electronic device of claim 1, comprising a first switch and a second switch configured to commutate during a time interval of at least two switching periods.

4. The power electronic device of claim 1, wherein the controller is configured to cause the inductor to charge for a first period of time when the first current is present and cause the inductor to charge for a second period of time when the second current is present, wherein the first period and the second period are approximately equal in time to each other.

5. The power electronic device of claim 1, wherein the controller is configured to cause the first current and the second current to conduct through the inductor to control a level of constructive harmonics.

6. The power electronic device of claim 1, wherein the first current and the second current comprises a half-wave symmetry.

7. The power electronic device of claim 1, wherein the first current and the second current comprises primarily odd harmonics.

8. The power electronic device of claim 1, further comprising a first common reference point and a second common reference point galvanically coupled to each other.

9. The power electronic device of claim 1, wherein the controller is configured to cause the first current to be approximately equal with respect to magnitude and time as the second current.

10. The power electronic device of claim 1, wherein the controller is configured to control a third current conducting through a second inductor and a fourth current conducting through the second inductor, wherein the third and fourth currents conduct in opposite directions with respect to each other, and the third and fourth currents interact with each other through the second inductor such that a second net direct current (DC) component through the second inductor is approximately zero.

11. The power electronic device of claim 1, wherein the controller is configured to reduce thermal heating by symmetrically opening and closing switches of the power electronic device.

12. The power electronic device of claim 1, wherein the first capacitor is configured to couple to a DC source, and the second capacitor is configured to couple to a DC load.

13. A vehicle, comprising:
   an electric propulsion system having an energy source coupled to a direct current (DC) bus, and a power electronic device coupled to the DC bus, wherein the power electronic device comprises at least one inductor coupled to a first capacitor and a second capacitor; and
   a controller operable to cause a first current conducting through the at least one inductor, and a second current conducting through the at least one inductor, wherein the first and second currents conduct in opposite directions with respect to each other, and the first and second currents interact with each other through the at least one inductor such that a net DC component through the at least one inductor is approximately zero, wherein the power electronic device comprises a third capacitor and a fourth capacitor, wherein the controller is operable to cause an increase or decrease in voltages from across the first capacitor and the second capacitor to across the third capacitor and the fourth capacitor.

14. The vehicle of claim 13, wherein the power electronic device comprises diodes configured to prevent the third capacitor or the fourth capacitor from discharging on the first capacitor or the second capacitor when a fault occurs.

* * * * *